United States Patent
Guterman

(10) Patent No.: US 7,886,987 B2
(45) Date of Patent: Feb. 15, 2011

(54) PRODUCTS AND PROCESS THAT ACT AS A SAFETY VALVE TO PREVENT SCALDING

(75) Inventor: Frederick Guterman, Greensboro, NC (US)

(73) Assignee: American Valve, Inc., Greensboro, NC (US)

( * ) Notice: Subject to any disclaimer, the term of this patent is extended or adjusted under 35 U.S.C. 154(b) by 845 days.

(21) Appl. No.: 11/895,149

(22) Filed: Aug. 23, 2007

(65) Prior Publication Data

US 2007/0290058 A1    Dec. 20, 2007

Related U.S. Application Data

(63) Continuation-in-part of application No. 11/241,212, filed on Sep. 30, 2005, now Pat. No. 7,407,113.

(51) Int. Cl.
*G05D 23/02* (2006.01)
*G05D 7/00* (2006.01)

(52) U.S. Cl. ............... 236/99 R; 236/100; 236/99 K; 236/93 A

(58) Field of Classification Search ............ 236/99 R, 236/93 A, 93 R, 100, 99 J, 46 R, 46 A, 46 F; 62/157, 158, 231
See application file for complete search history.

(56) References Cited

U.S. PATENT DOCUMENTS

| | | | | |
|---|---|---|---|---|
| 2,408,269 A | * | 9/1946 | Peterson | 236/34 |
| 2,495,226 A | * | 1/1950 | Crago | 236/1 C |
| 3,096,021 A | * | 7/1963 | Lintvedt | 236/20 R |
| 3,539,099 A | * | 11/1970 | Grohe | 236/12.2 |
| 4,026,464 A | * | 5/1977 | Doherty, Jr. | 236/48 R |
| 4,032,071 A | * | 6/1977 | Imoto | 236/101 E |
| 4,128,203 A | * | 12/1978 | Maltby | 236/100 |
| 4,220,175 A | * | 9/1980 | Keller et al. | 137/454.6 |
| 4,226,362 A | * | 10/1980 | Foller | 236/58 |
| 4,299,354 A | | 11/1981 | Ketley | |
| 4,303,195 A | * | 12/1981 | Hashimoto et al. | 236/48 R |
| 4,313,350 A | | 2/1982 | Keller, III | |
| 4,776,559 A | | 10/1988 | Forasari | |
| 4,883,082 A | * | 11/1989 | Pirkle | 137/62 |
| 5,024,378 A | | 6/1991 | Bergmann et al. | |
| 5,141,153 A | | 8/1992 | Jeffress | |
| 5,172,860 A | | 12/1992 | Yuch | |

(Continued)

OTHER PUBLICATIONS

Don Vandervort, Scald-Free Shower Heads, Internet printout from www.hotmetips.com, Aug. 3, 2005.

(Continued)

*Primary Examiner*—Frantz F Jules
*Assistant Examiner*—Alexis K Cox

(57) ABSTRACT

A thermostatic valve incorporated within a plumbing system for regulating the flow of fluid. The thermostatic valve includes two valve assemblies operatively cooperating to preclude the flow of scalding water. The first valve assembly and second valve assembly respond to different fluid temperatures, as well as, over separate periods of time. The thermostatic valve can be incorporated in an "end-line" device such as a showerhead or faucet assemblies to create an "anti-scaled" plumbing fixture. The invention includes a valve housing having a first compartment and a second compartment, a fluid passageway, a first valve assembly, a second valve assembly, a first spring, a first stopper, a first flange, a first thermostatic cylinder, a second spring, a second stopper, a second flange, a second thermostatic cylinder, and a third spring.

3 Claims, 5 Drawing Sheets

U.S. PATENT DOCUMENTS

| | | | |
|---|---|---|---|
| 5,181,656 A * | 1/1993 | Schwerdt | 237/8 C |
| 5,368,227 A | 11/1994 | McGinnis | |
| 5,560,541 A | 10/1996 | Warshawsky | |
| 5,584,432 A | 12/1996 | Lockhart | |
| 5,620,021 A | 4/1997 | Hugo | |
| 5,647,530 A | 7/1997 | Lorch | |
| 5,803,354 A | 9/1998 | Benedict | |
| 5,931,181 A * | 8/1999 | Cook et al. | 137/100 |
| 5,944,255 A | 8/1999 | Shirmohamadi | |
| 5,967,409 A | 10/1999 | Benedict | |
| 6,039,263 A * | 3/2000 | Kalbacher et al. | 236/93 A |
| 6,264,121 B1 | 7/2001 | McClary | |
| 6,604,687 B2 | 8/2003 | Goncze | |
| 6,772,958 B1 | 8/2004 | Lamb | |
| 2003/0197065 A1 | 10/2003 | Graves | |

OTHER PUBLICATIONS

First and second thermostatic cylinder shown and described in application by character references 7 and 53.

* cited by examiner

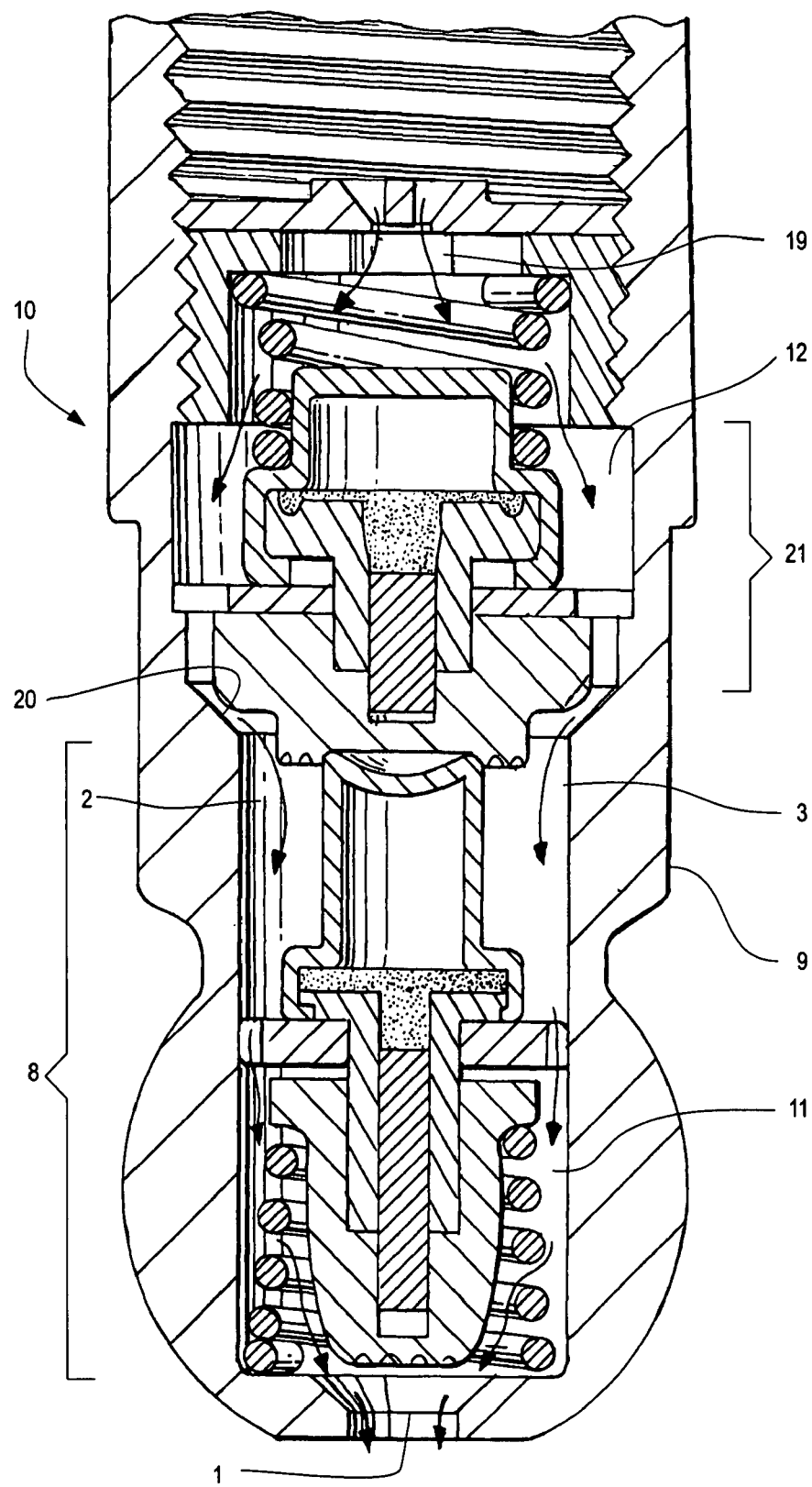

Fig. 7
Fig. 8
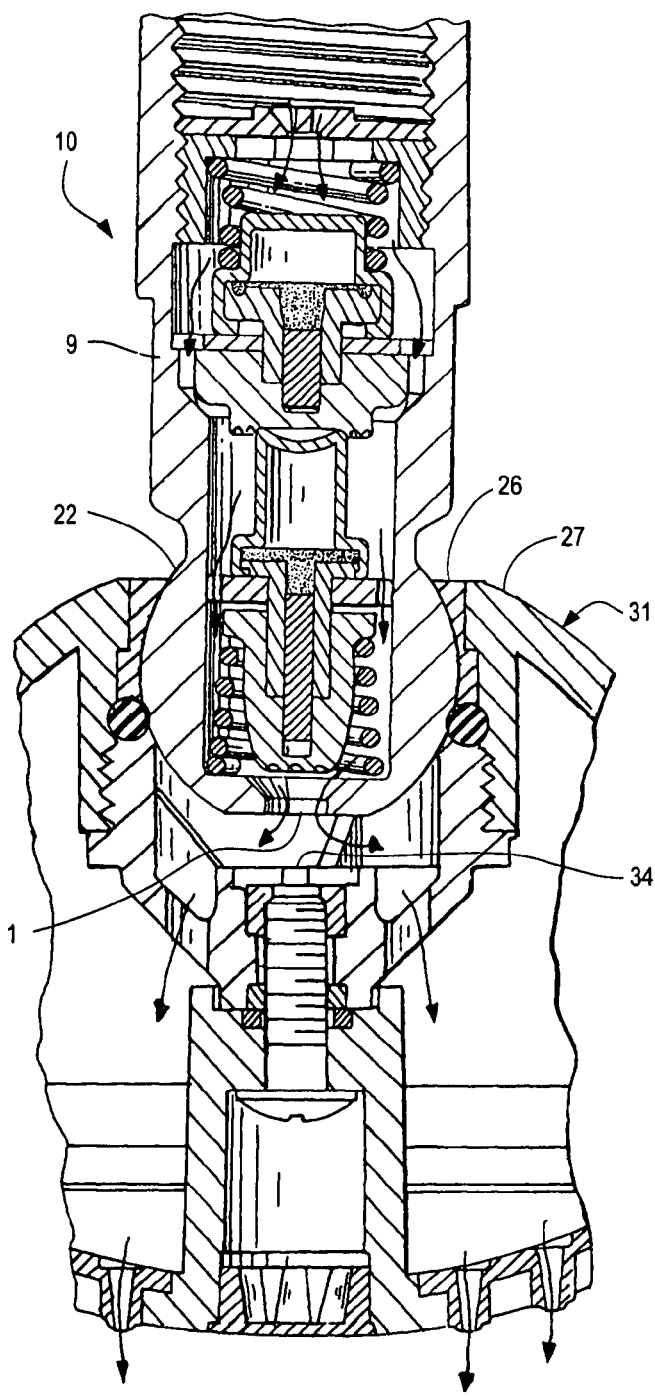
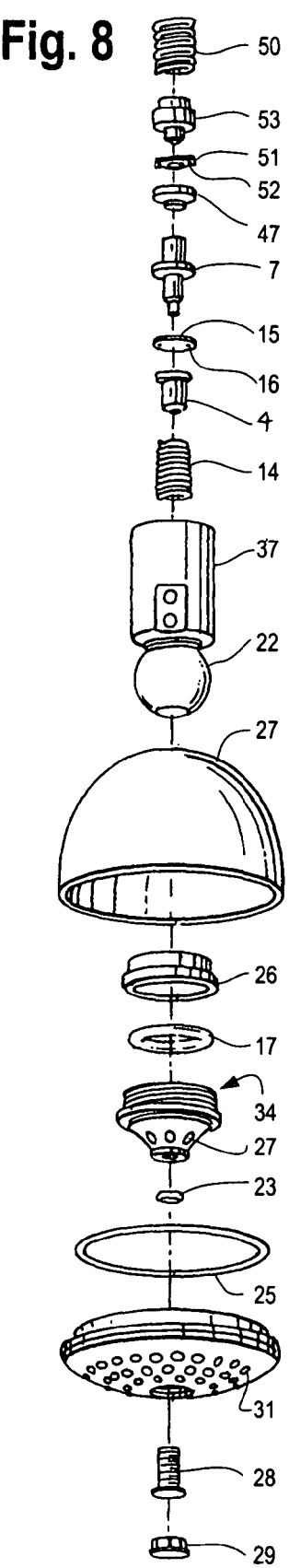

PRODUCTS AND PROCESS THAT ACT AS A SAFETY VALVE TO PREVENT SCALDING

This application is a continuation in part from patent application Ser. No. 11/241,212 with a filing date of Sep. 30, 2005 now U.S. Pat. No. 7,407,113. American Valve, Inc. is the assignee of this application and application Ser. No. 11/241,212. There is one or more inventors in common between the applications.

BACKGROUND OF THE INVENTION

The present invention generally relates to a thermostatic fluid controller, and more particularly, to a thermostatic fluid controller for showerhead assemblies and faucet assemblies featuring two thermostatic cylinders for precluding water between different pre-determined temperatures for an increased closing time over a broader range of temperatures.

Recent legislation requiring products to prevent accidents involving scalding water indicates an increased interest in devices that can control water, namely hot water. Scald-burn injuries can range from minor to life-threatening and can even cause death in certain cases. These injuries are frequently caused by water temperature fluctuation in the plumbing system. Occurrences such as toilets being flushed are common causes of water temperature fluctuations. As an example, when a toilet is flushed while a shower or faucet with a proper hot-to-cold water ratio is running, cold water is used to refill the tank of the toilet and, consequently, the water pressure, from the cold water pipes, decreases. The result is that less cold water is available for the hot/cold mix flowing to the shower, bathtub, or faucet, thereby causing the water mix to increase in temperature. In many instances, the temperature for hot water can be too hot in buildings that share a common boiler or water heater, i.e. apartment buildings, hospitals, or nursing homes. Frequently water temperatures in these residential and commercial water supplies can exceed 130° F., temperatures at which an adult can easily be scalded or burned. Children are especially vulnerable to being scalded from overly-hot bath or shower mix because they have thinner skin than adults. A child can sustain a third degree burn from exposure to 140° F. water for a mere three seconds.

The water temperature in buildings that share a common boiler or water heater is often kept higher than recommended so that a sufficient source of hot water is available to a great number of users at a given time. This means that a way to regulate the temperature at the "end-line" location in buildings with a large common boiler is critical.

The serious consequences of over-hot water temperatures has caused a majority of states to enact legislation requiring new construction to incorporate anti-scald devices that feature a means of controlling maximum water temperatures delivered to the faucet and showerhead assemblies. These regulations, however, only apply to new construction and do not mandate the use of anti-scald fixtures in older buildings. Since the legislation applies only to new construction, many of the anti-scald devices currently known in the field relate to devices incorporated "in-line" or behind the walls adjacent to the showers, bathtubs or sinks, or are otherwise difficult to access and require the skill of a professional plumber.

Such "in-line" devices are incorporated within the lines of the home or business plumbing systems. These devices are normally installed prior to the interior finishing and "drywalling." These devices often have a reset capability for normal use. However, when the device is damaged, defective, or is unable to be reset, it is very difficult to repair or replace the device without a trained plumber. Furthermore, the devices are incorporated behind the walls, so it is necessary to tear out portions of the wall to replace or repair the device. Such destruction can be very costly. Furthermore, a device that electronically controls the temperature of water often has a sensor component, which is mounted behind the wall of the shower. In situations of an electrical malfunction or short circuit, the electronic device is only accessible by a plumber. Such systems can lead to high repair costs.

An "in-line" device is incorporated for use with existing faucet assemblies or showerhead assemblies, and is described in U.S. Pat. No. 5,584,432 ("'432 patent"). The '432 patent teaches a structure for blocking the flow of water using a shape memory alloy spring. The shape memory alloy spring stiffens at a specific temperature against a valve to preclude the flow of water from exiting the valve. The shape memory alloy spring softens at a second pre-determined temperature to enable the flow of water to exit the valve.

The previously described regulating devices in the prior art are for "in-line" locations rather than "point-of-use" locations. The Safe Drinking Water Act amendments of 1996, 104 P.L. 182 (1996), distinguishes between point-of-entry and point-of-use devices in §105. Point-of-entry devices are located at a plumbing systems "in-line" location, or in other words, located within the plumbing supply pipes. Point-of-use devices are located at the systems "end-line" location, or in other words, the apparatus the consumer uses.

The present invention is an "end-line" device integrated into a unique faucet assembly or shower head assembly. The present invention offers an "end-line" anti-scald device providing relatively inexpensive scald prevention in both new and existing homes and/or commercial buildings. The invention's location in the water supply system, integrated into an "end-user" device offers inexpensive and efficient scald prevention. This "end-line" location offers a device that blocks the flow of excessively hot water and is located in a showerhead assembly or a faucet assembly. Previous devices are incorporated directly into the plumbing system behind the walls of a building. The present invention enables the user to incorporate an anti-scald system into pre-existing plumbing systems and can be easily replaced by the user. Replacement occurs by replacement of the unit at the end of the water line.

The previous devices utilize a single thermostatic cylinder having a specific "ramp-up" time period. These devices do not account for instances where the change in fluid temperature instantly increases because the slow reaction time of the single thermostatic cylinder. Therefore, there is a need for thermostatic fluid controllers that regulate fluid flow when fluid temperature changes at a moderate rate and when fluid temperature changes at a high rate. The present invention solves this problem by incorporating a primary and secondary thermostatic cylinder system designed to operate at separate temperatures as well as over different temperature ranges.

SUMMARY OF THE INVENTION

The present invention is directed to a thermostatic valve suitable for blocking the flow of water between predetermined temperatures that may be used in a plumbing system comprising, a valve housing having a first compartment and a second compartment, where the first compartment includes a first inlet end and a first outlet end, and the second compartment includes a second inlet end and a second outlet end; a fluid passageway which communicates between the first compartment and the second compartment; a first valve assembly which is housed within the first compartment and a second valve assembly which is housed within the second compartment, such that the first valve assembly responds to fluid temperature changes and the second valve assembly responds to fluid temperature changes, such that the first valve assembly and the second valve assembly operatively cooperate to preclude the flow of scalding fluid;

The first valve assembly includes: a first spring associated with the valve housing which is proximate to the outlet aperture end; a first stopper which is biased by the first spring, such that a first face of the first stopper forms a first gap with the first outlet end; a first flange abuts the first stopper on the opposite side of the first gap in the first compartment, such that the first flange permits the flow of water between the first inlet end and the first outlet end; a first thermostatic cylinder having a first cylinder body, a first piston housing, and a first piston where the first cylinder body abuts the first flange, such that the first piston axially extends through the first piston housing from the first cylinder body, and the first cylinder body includes a first temperature sensitive wax, where the first temperature sensitive wax and the first piston axially cooperate to produce axial movement of the first stopper to substantially block the first outlet end;

The second valve assembly includes: a second stopper with a second face forming a second gap with the second outlet end; a second flange which abuts a shoulder in the second compartment, such that the second flange permits the flow of fluid between the second inlet and the second outlet end; a second thermostatic cylinder having a second cylinder body, a second piston housing, and a second piston, such that the second cylinder body abuts the second flange, where the second piston axially extends through the piston housing from the second cylinder body, the second cylinder body includes, a second temperature sensitive wax, such that the second temperature sensitive wax and the second piston axially cooperate to produce axial movement of the second stopper to substantially block the second outlet end; also, a second spring which biases the second cylinder body against the second flange, such that the second spring associates with the second compartment at the second inlet end.

A method of supplying temperature regulated fluid, comprising the steps of flowing hot fluid from a second compartment having temperature regulated by a second valve assembly to a first compartment having temperature regulated by a first valve assembly, such that said second compartment and the first compartment communicate to form a fluid passageway; blocking hot fluid in the first compartment by the first valve assembly when the fluid temperature rises above a third predetermined temperature, where the first valve assembly includes a first thermostatic cylinder and a first stopper which axially associates with the first thermostatic cylinder to block hot fluid from flowing through the first compartment; releasing hot fluid from the first compartment by the first valve assembly when the fluid temperature drops below the third predetermined temperature, where the first thermostatic cylinder resets to its pre-response position to release the hot fluid; blocking hot fluid in the second compartment by the second valve assembly when the fluid temperature rises above a second predetermined temperature, where the second valve assembly includes a second thermostatic cylinder and a second stopper which axially associates with the second thermostatic cylinder to block hot fluid from flowing through the second compartment; releasing hot fluid from the second compartment by the second valve assembly when the fluid temperature drops below the second predetermined temperature, where the second thermostatic cylinder resets to its pre-response position to release hot fluid.

BRIEF DESCRIPTION OF THE DRAWINGS

FIG. 1 is a cut-away cross section view of the thermostatic controller.

FIG. 7 is a cut-away cross section view of the thermostatic controller within a shower head, an alternate embodiment.

FIG. 8 is a partially sectional pre-assembly exploded view of the thermostatic controller and the shower head thermostatic insert housing.

DETAILED DESCRIPTION OF THE PREFERRED EMBODIMENTS

Figure 3:
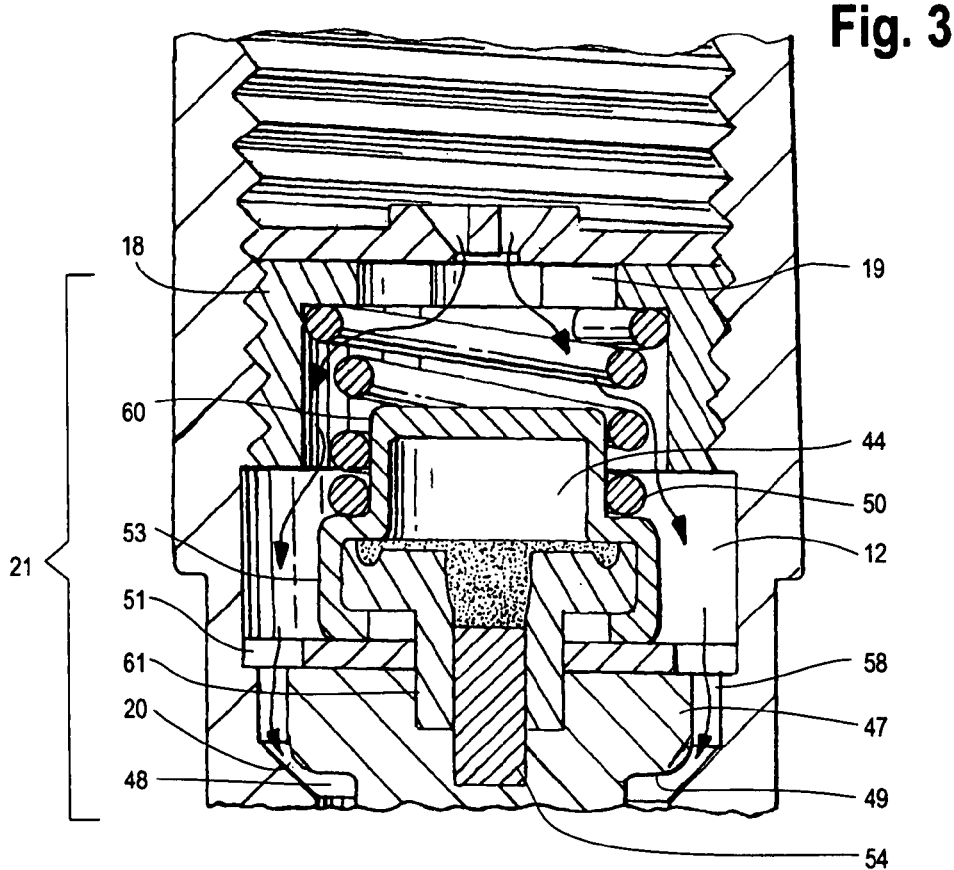
FIG. 3 is a cut-away, partial close up view of the second valve assembly in the normally open position.

Referring to FIG. 1, the thermostatic valve 10 is situated within a valve housing 9. The valve housing 9 includes a first compartment 11 and a second compartment 12. A fluid passageway 3 communicates between first compartment 11 and second compartment 12 to allow fluid to flow from a second inlet end 19 to a first outlet end 1. A first valve assembly 8 is housed within first compartment 11. The first valve assembly 8 responds to a first predetermined temperature of fluid entering a first inlet end 2 of first compartment 11 to block first outlet end 1. A second valve assembly 21 is housed within second compartment 12. Additionally, the second valve assembly 21 responds to a second predetermined temperature of fluid entering second inlet end 19 to block second outlet end 20.

Figure 2:
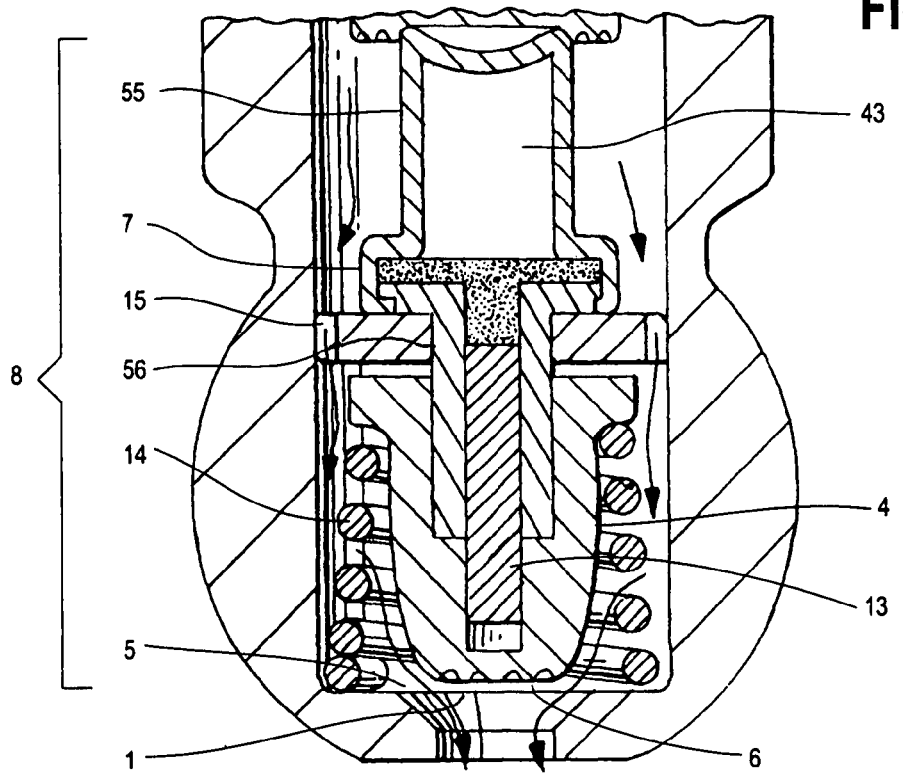
FIG. 2 is a cut-away, partial close up view of the first valve assembly in the normally open position.

FIG. 2 shows an exploded view of first valve assembly 8, which includes a first thermostatic cylinder 7. The first thermostatic cylinder 7 includes a first cylinder body 55, a first piston housing 56, and a first piston 13. The first cylinder body 55 is positioned next to a first flange 15. A first temperature sensitive wax 43 is located in the first cylinder body 55; while, the first piston 13 axially extends from the first cylinder body 55 outward through first piston housing 56. The first piston 13 axially associates between the first temperature sensitive wax 43 and a first stopper 4. The first stopper 4 includes a first face 6, while the first stopper 4 is biased by a first spring 14 to form a first gap 5 between first face 6 and first outlet end 1. The first spring 14 is preferably compressed between the first outlet end 1 and first stopper 4.

FIG. 3 details the second valve assembly 21, which includes a second thermostatic cylinder 53. The second thermostatic cylinder 53 includes a second cylinder body 60, a second piston housing 61, and a second piston 54. The second cylinder body 60 is securely positioned against a second flange 51 by a second spring 50 that is compressed against a spring catch insert 18 at second inlet end 19. Second flange 51 abuts a shoulder 58 as to keep second cylinder body 60 stationary against second spring 50. A second temperature sensitive wax 44 is located in the second cylinder body 60, while the second piston 54 axially extends outward from second cylinder body 60 through second piston housing 61.

The second piston 54 axially associates between the second temperature sensitive wax 44 and a second stopper 47. The second stopper 47 includes a second face 49 that forms a second gap 48 between second face 49 and a second outlet end 20 of the second compartment 12.

Figure 4:
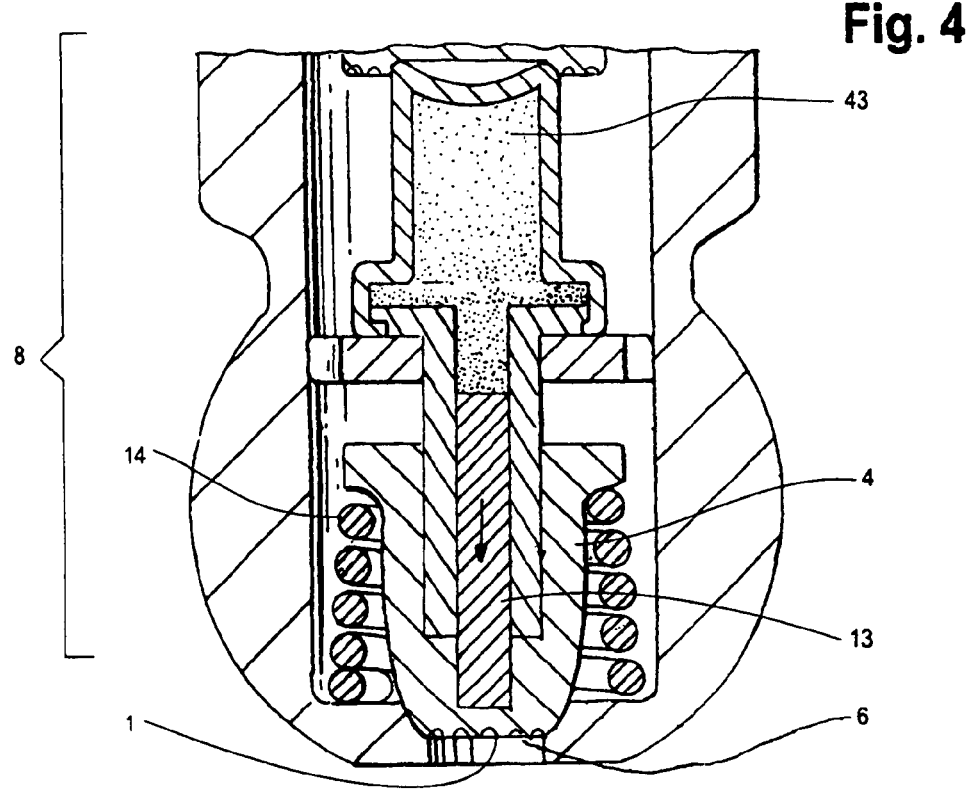
FIG. 4 is a cut-away, partial close up view of the first valve assembly in the closed position.

FIG. 4 shows the first valve assembly 8 blocking the flow of fluid from the first outlet end 1. Preferably, the first spring 14 is a cylindrical coil spring of corrosion resistant steel with a spring rate which corresponds to a force exerted by the first temperature sensitive wax 43 when it expands to move first piston 13. The first temperature sensitive wax 43 expands at a fourth predetermined temperature predetermined temperature, such that first predetermined temperature sensitive wax 43 expands to axially associate with first piston 13. Subsequently, at a first predetermined temperature, first piston 13 axially moves the first stopper 4 toward the first outlet end 1. The first face 6 of first stopper 4 cooperates with the first outlet end 1 to substantially block fluid from flowing out the first outlet end 1. Preferably, the fourth predetermined temperature is 113° F., where the first temperature sensitive wax 43 begins expanding. The expansion of the first temperature sensitive wax 43 results in a force upon first piston 13 at fourth predetermined temperature to axially engage with first stopper 4. However, first spring 14 will prevent first stopper 4 from axially moving into contact with first outlet end 1, thereby preventing any change in flow rate at first outlet end 1. Preferably, when the first predetermined temperature temperature of the first temperature sensitive wax 43 is 117° F., the first temperature sensitive wax 43 will significantly expand to axially move first stopper 4 to substantially engage first outlet end 1 and restrict flow of the fluid. In a preferred embodiment, the first valve assembly 8 substantially blocks the first outlet end 1 at a at a first predetermined temperature within a first time range of at least a minute. Preferably, the first valve assembly 8 shown in FIG. 4 will completely terminate the flow of fluid from passageway 3 shown in FIG. 1 at a third predetermined temperature of 120° F. in a second time range of 10 seconds. Alternatively, all predetermined temperatures in the can be adjusted to temperatures between 70° F. and 130° F. in order to preclude scalding.

Figure 5:
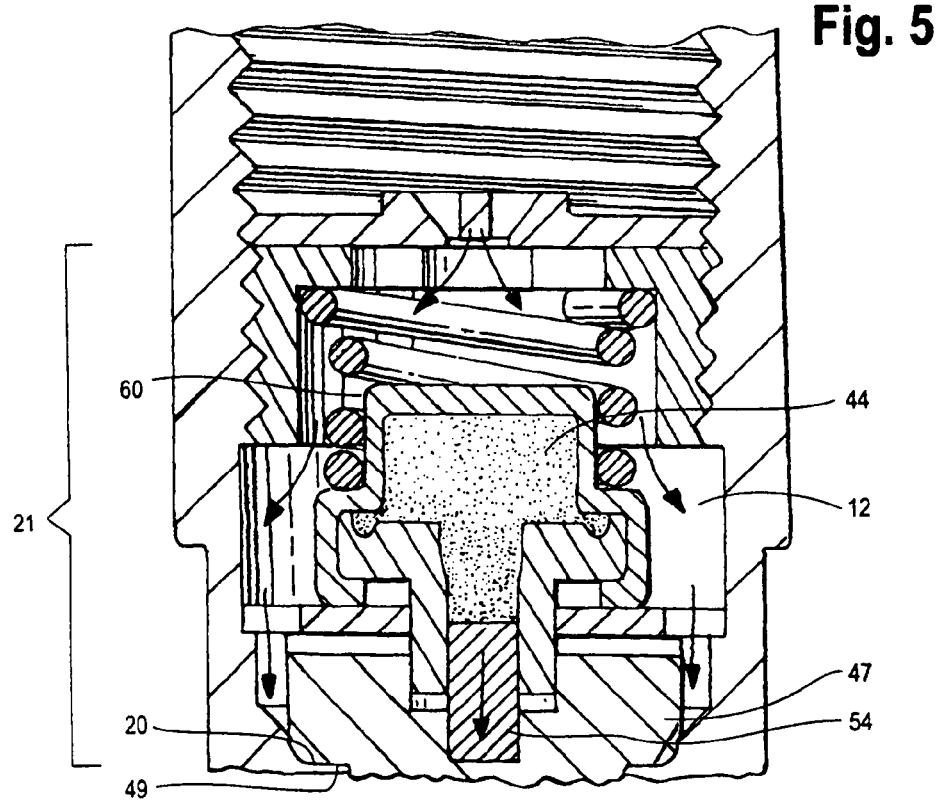
FIG. 5 is a cut-away, partial close up view of the second valve assembly in the closed position.

FIG. 5 shows the second valve assembly 21 blocking the flow of fluid from the second outlet end 20. The second temperature sensitive wax 44 expands at a second predetermined temperature and axially moves the second piston 54. Preferably, the second temperature sensitive wax 44 responds to a second predetermined temperature of 130° F. or greater to expand and axially move second piston 54 to engage second stopper 47. Immediately, second piston 54 axially moves the second stopper 47 towards second outlet end 20. Once the fluid temperature reaches 130° F., the second face 49 substantially engages the second outlet end 20 to block fluid from flowing out of second compartment 12. Preferably, the second cylinder body 60 has a smaller volume than first cylinder body 55, in order for the second temperature sensitive wax 44 to quickly expand upon temperatures of 130° F. or greater. Alternatively, the distance between second outlet end 20 and second piston 54 is relatively small to facilitate a quick engagement time between second stopper 47 and second outlet end 20. Alternatively, the second temperature sensitive wax 44 can expand in response to temperatures between 100° F. and 200° F.

Figure 6:
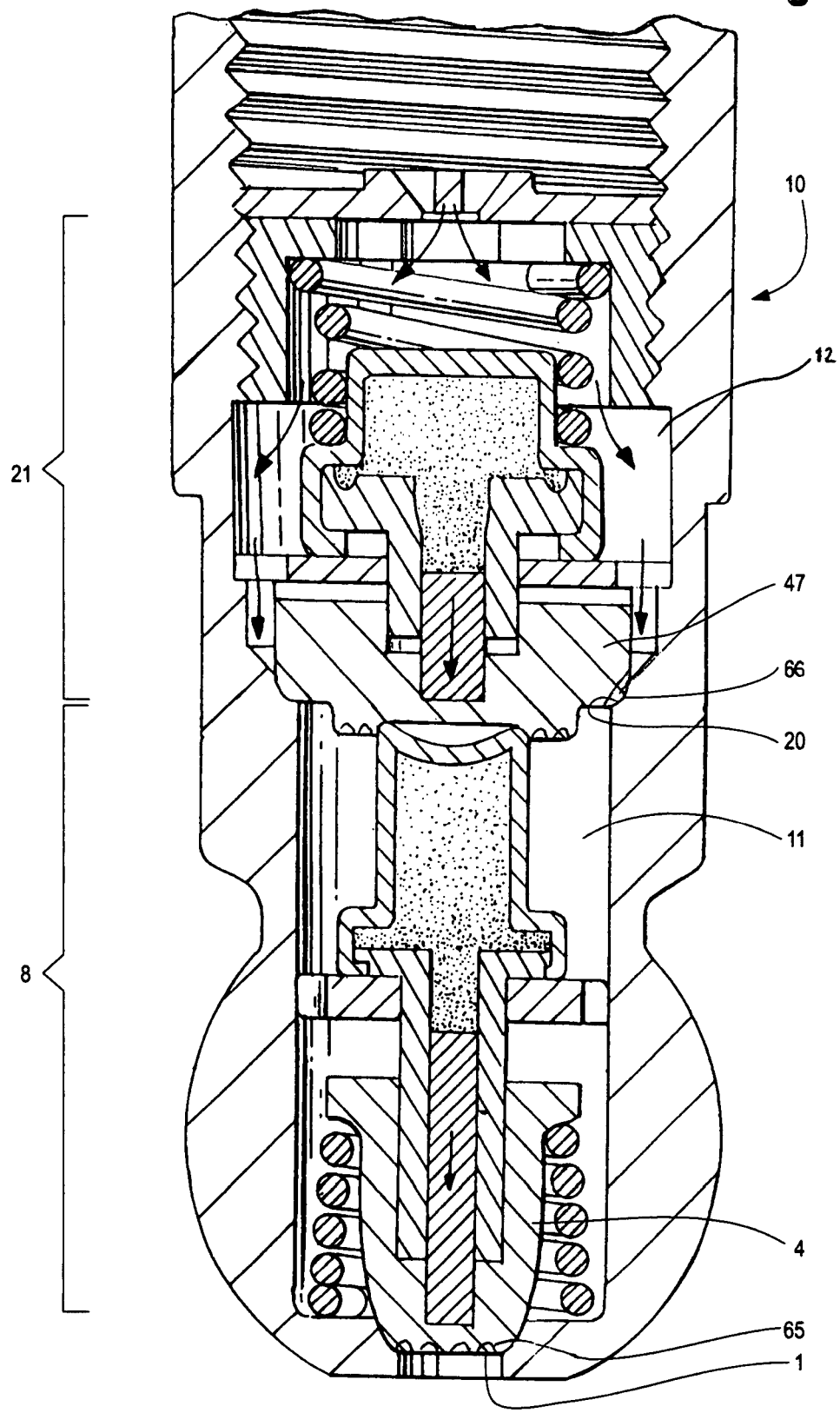
FIG. 6 is a cut-away cross section view of the thermostatic controller where the first valve assembly and the second valve assembly are in the closed position.

FIG. 6 details the thermostatic valve 10 in the closed position, where both the first valve assembly 8 and the second valve assembly 21 are in the closed position. Between temperatures of 113° F. and 117° F., first valve assembly 8 initializes the axial movement of first stopper 4 to begin the closing process of first outlet end 1. However, if temperatures were to rapidly heat to 130° F. or higher while the first valve assembly 8 was in the closing process, second valve assembly 21 would rapidly close the second outlet end 20 by second stopper 47 to prevent further fluid flow into the first compartment 11.

Alternatively, the first stopper 4 includes a plurality of weep holes 65 that allow the hot fluid to trickle out, as shown in FIG. 6. Consequently, cold fluid is able to cycle in after the first valve assembly 8 is in the closed position. Such cold fluid will cool the temperature of the fluid in the first compartment 12, so that the first temperature sensitive wax 43 will cool and contract, thereby causing the first valve assembly 8 to open first outlet end 1. Likewise, the second stopper 47 includes a plurality of weep holes 66 that allow hot fluid to trickle out. Consequently, cold fluid is able to cycle in after the second valve assembly 21 is in the closed position. Such cold fluid will cool the temperature of the fluid in the second compartment 12, so that the second temperature sensitive wax 44 will cool and contract causing second valve assembly 21 to open second outlet end 20.

FIG. 7 and FIG. 8 illustrates one preferred embodiment of the thermostatic valve 10 removably attached to a shower head 31. In FIG. 7, the valve housing 9 includes a ball joint geometry end 22 that is rotatably mounted to a reciprocal ball joint geometry washer 26. The reciprocal ball joint geometry washer 26 is surrounded by a first O-ring 17 and is removably associated with retainer 27, so that first outlet end 1 communicates with shower head second inlet end 34. A second O-ring 25 is then inserted to ensure no leakage between showerhead 31 and retainer 27. Also, washer 29 and screw 28 secure connection of showerhead 31 to the rest of the assembly. Fluid flow then departs through showerhead second outlet end 29 by a fluid spraying means 30.

FIG. 8 illustrates the assembly of thermostatic valve 10 within a showerhead assembly 32. First spring 14 is inserted into the valve housing 9 in order to attach to the first outlet end 1, as shown in FIG. 7 and FIG. 8. First stopper 4 is inserted such that first spring 14 surrounds first stopper 4 which causes first stopper 4 to abut against first outlet end 1, as shown in FIG. 6. Next, first flange 15 is removably attached to the mid portion of valve housing 9, as shown in FIG. 7 and FIG. 8. Also, the first flange 15 includes first flange apertures 16, which permit fluid to flow from first inlet end 2 to first outlet end 1. Then, first thermostatic cylinder 7 is inserted so that the first cylinder body 55 abuts first flange 15. Second stopper 47 is inserted against the second end of first thermostatic cylinder 7. Next, second flange 51 is inserted, seen in FIG. 3, as to removably associate to second compartment 12, also shown in FIG. 3. Also, second flange 51 includes second flange apertures 52 that permit fluid to flow from second inlet end 19 to second outlet end 20. Second thermostatic cylinder 53 is inserted to abut second flange 51. Second spring 50 is inserted so that second spring 50 surrounds the second cylinder body 60 and abuts to spring catch insert 18, shown in FIG. 3.

In operation, the first valve assembly 8 starts to react at a first predetermined temperature; however, the first spring 14 is coiled to deter axial movement of first stopper 4, as shown in FIG. 2. The first thermostatic cylinder 7 is of the wax-filled or paraffin-filled type generally known in the art. The first thermostatic cylinder 7 is filled with a temperature sensitive wax 43 formulated to change from solid to liquid or from liquid to solid over a predetermined temperature range. As the temperature sensitive wax 43 changes state from solid to liquid, its volume increases. The increase in volume displaces the first piston 13 to extend outwards from the first piston housing 56. Motion is transmitted from the first temperature sensitive wax 43 to first piston 13 in the first cylinder body 55, as shown in FIG. 4. First piston 13 axially engages the first stopper 4, while the first thermostatic cylinder 7 remains stationary biased against first flange 15. Subsequently, first stopper 4 abuts first outlet end 1 to preclude the flow of fluid out of first outlet end 1. In FIG. 5, the second thermostatic cylinder 53 responds to increases in temperature just as first thermostatic cylinder 7 described above.

Once the temperature of the temperature sensitive wax 43 drops below the predetermined temperature range, the temperature sensitive wax 43 volume decreases to enable first spring 14 to axially bias first stopper 4 to form first gap 5. Thus, first valve assembly 8 is reset to enable the flow of fluid out of first outlet end 1. The second valve assembly 21 responds to temperature decreases just as first valve assembly 8 described above. The first temperature sensitive wax 43 may be formulated to produce a solid to liquid transition over a 4° F. change in temperature. The first temperature sensitive wax 43 may also allow selection of the transition temperature over a predetermined range of 113° F. to 120° F.

The above has been provided for illustrative purposes only and is not intended to limit the scope of the invention of this application which is defined in the claims below. Accordingly, the description is provided for the purposes of teaching those skilled in the art the best mode for carrying out the invention

We claim:

1. A method of supplying temperature regulated fluid, comprising:

flowing hot fluid from a second compartment having temperature regulated by a second valve assembly to a first compartment having temperature regulated by a first valve assembly, such that said second compartment and said first compartment communicate to form a fluid passageway;

blocking hot fluid in said first compartment by said first valve assembly when the fluid temperature rises above a first predetermined temperature, where said first valve assembly includes a first thermostatic cylinder and a first stopper axially associated with said first thermostatic cylinder to block hot fluid in said first compartment;

releasing hot fluid from said first compartment by said first valve assembly when the fluid temperature drops below said first predetermined temperature, where said first thermostatic cylinder releases said first stopper to release hot fluid;

blocking hot fluid in said second compartment by said second valve assembly when fluid temperature rises above a second predetermined temperature, where said second valve assembly includes a second thermostatic cylinder and a second stopper axially associated with said second thermostatic cylinder to block hot fluid in said second compartment;

releasing hot fluid from said second compartment by said second valve assembly when the fluid temperature drops below said second predetermined temperature, where said second thermostatic cylinder resets to its pre-response position to release hot fluid, and regulating flow of hot fluid in said first compartment at a third predetermined temperature, wherein said third predetermined temperature is 120° F.

2. The method of claim 1, further comprising regulating flow of hot fluid in said first compartment where said first predetermined temperature is 117° F.

3. The method of claim 2, further comprising regulating flow of hot fluid in said second compartment where said second predetermined temperature is 130° F.

* * * * *